United States Patent [19]
Consiglio

[11] Patent Number: 4,785,567
[45] Date of Patent: Nov. 22, 1988

[54] ILLUMINATED FISHING ASSEMBLY

[76] Inventor: Thomas J. Consiglio, 10780 Wrenfield Dr., St. Louis, Mo. 63123

[21] Appl. No.: 143,571

[22] Filed: Jan. 13, 1988

[51] Int. Cl.⁴ .............................................. A01K 91/00
[52] U.S. Cl. ..................................................... 43/17.5
[58] Field of Search .................. 43/17.5, 17.6, 42.74, 43/44.84, 43.1, 44.87

[56] References Cited

U.S. PATENT DOCUMENTS

| | | | |
|---|---|---|---|
| 2,961,793 | 11/1960 | Buchanan | 43/42.74 |
| 3,502,861 | 3/1970 | Evans | 43/17.5 |
| 3,579,893 | 5/1971 | Wolfe | 43/17.5 |
| 3,798,822 | 3/1974 | Lampus | 43/17.5 |
| 4,475,301 | 10/1984 | Wortham | 43/17.5 |
| 4,553,194 | 11/1985 | Bailey | 43/17.5 |
| 4,561,206 | 12/1985 | Lowrance | 43/42.74 |
| 4,589,221 | 5/1986 | Mattison | 43/17.6 |
| 4,607,317 | 8/1986 | Lia | 362/249 |
| 4,617,751 | 10/1986 | Johansson | 43/17.5 |
| 4,649,660 | 3/1987 | Kurka | 43/17.5 |

Primary Examiner—Gene P. Crosby
Attorney, Agent, or Firm—Kalish & Gilster

[57] ABSTRACT

An illuminated fishing assembly comprises a bendable and foldable bar having lamps or bulbs provided therein with the predetermined numbers thereof being connected serially and with the lamps being connected in parallel. There is provided a remotely located power source and with conductors interengaging the same with the lamps. The exterior wall of the bar is transparent so that upon energization of the lamps light will be transmitted through the exterior wall for illuminating the ambient body of water. The bar is suspended within the water from a bouyant member by an elongated flexible member of any predetermined length so as to permit location of the bar at a desired depth. There is suspended from the bar a fishing line of any preselected length which at its end remote from the bar carries conventional fish attracting bait.

6 Claims, 2 Drawing Sheets

ILLUMINATED FISHING ASSEMBLY

BACKGROUND OF THE INVENTION

1. Field of the Invention

The present invention relates, in general, to fishing equipment and, more particularly, to a fishing assembly incorporating novel below water-surface illuminating means for attracting fish into the bait-containing zone.

2. Description of the Prior Art

Heretofore, the provision of illuminating expedients in conjunction with fishing equipment has been broadly known and utilized but for quite distinct purposes. Primarily, luminescent members have been incorporated in fishing floats so that during fishing at dusk, nighttime, or before sunrise the location of the float is readily determinable by the fisherman as well as the successful hooking of a fish by reason of the bobbing action imparted to the lighted float the of tugging upon the line. U.S. Pat. Nos. 3,798,822 and 4,553,194 both disclose embodiments of such floating lights. U.S. Pat. No. 3,579,893 is a variation in that the float disclosed is designed for daytime fishing but includes surfaces adapted for reflecting the sun's rays to the fisherman. Another modification of such a fishing float is shown in U.S. Pat. No. 4,649,660 which demonstrates a float incorporating a chemiluminescent light stick activation of which the float is visible at night.

In addition to lighted fishing floats, illuminating means have been to some degree used in coordination with a particular bait or lure. Thus, in U.S. Pat. No. 4,589,221, there is shown a fishing lure which is manufactured of a translucent material incorporating a cavity for receiving a cylindrical container for chemicals for generating chemiluminescent light upon mixture of the chemicals and thereby providing illumination for fish attraction. It will thus be seen that in this embodiment the lure is specially constructed so as to be rendered luminscent and accordingly is restricted in character.

In U.S. Pat. No. 4,617,751, the fishing tackle therein revealed embodies bait which is especially made of a material with reflecting, luminescent, light-scattering or transmitting components. A fishing line including at least one light guide in the form of an optic connection between a hand-operated tool and the bait is provided for transmitting light to the bait. Thus, in this disclosure a very complex illuminating expedient is used and which necessitates tool which must be operated by the fisherman for transmitting light throughout the line to the remotely located bait.

Consequently, the prior art structures relating to the use of luminescent means with fishing equipment either relate to a fishing float or to especially constructed bait which is specifically designed for illumination.

SUMMARY OF THE INVENTION

Therefore, it is an object of the present invention to provide a fishing assembly incorporating means for illuminating the zone below water-surface within which the bait is disposed.

It is a futher object of the present invention to provide a fishing assembly of the type stated wherein conventional bait or lures are utilized thereby obviating any need for especially constructing same for illumination whereby the fisherman can use any type of lure or bait he desires.

It is another object of the present invention to provide a fishing assembly of the type stated wherein the bait or lure is suspended from the illuminating means which is thus interposed between the fisherman and the bait or lure.

It is a still futher object of the present invention to provide a fishing assembly of the type stated which embodies luminescent means for disposition below water-surface, which may be of any predetermined length, for presenting a lighting zone of such extent as the fisherman may elect.

It is a still futher object of the present invention to provide a fishing assembly of the type stated which incorporates a conventional float member without lighting means.

It is another object of the present invention to provide a fishing assembly of the character stated which is comprised of inexpensive yet durable components; which may be inexpensively manufactured; and which assembly is resistant to wear.

DESCRIPTION OF THE PREFERRED EMBODIMENT OF THE INVENTION

Figure 1:
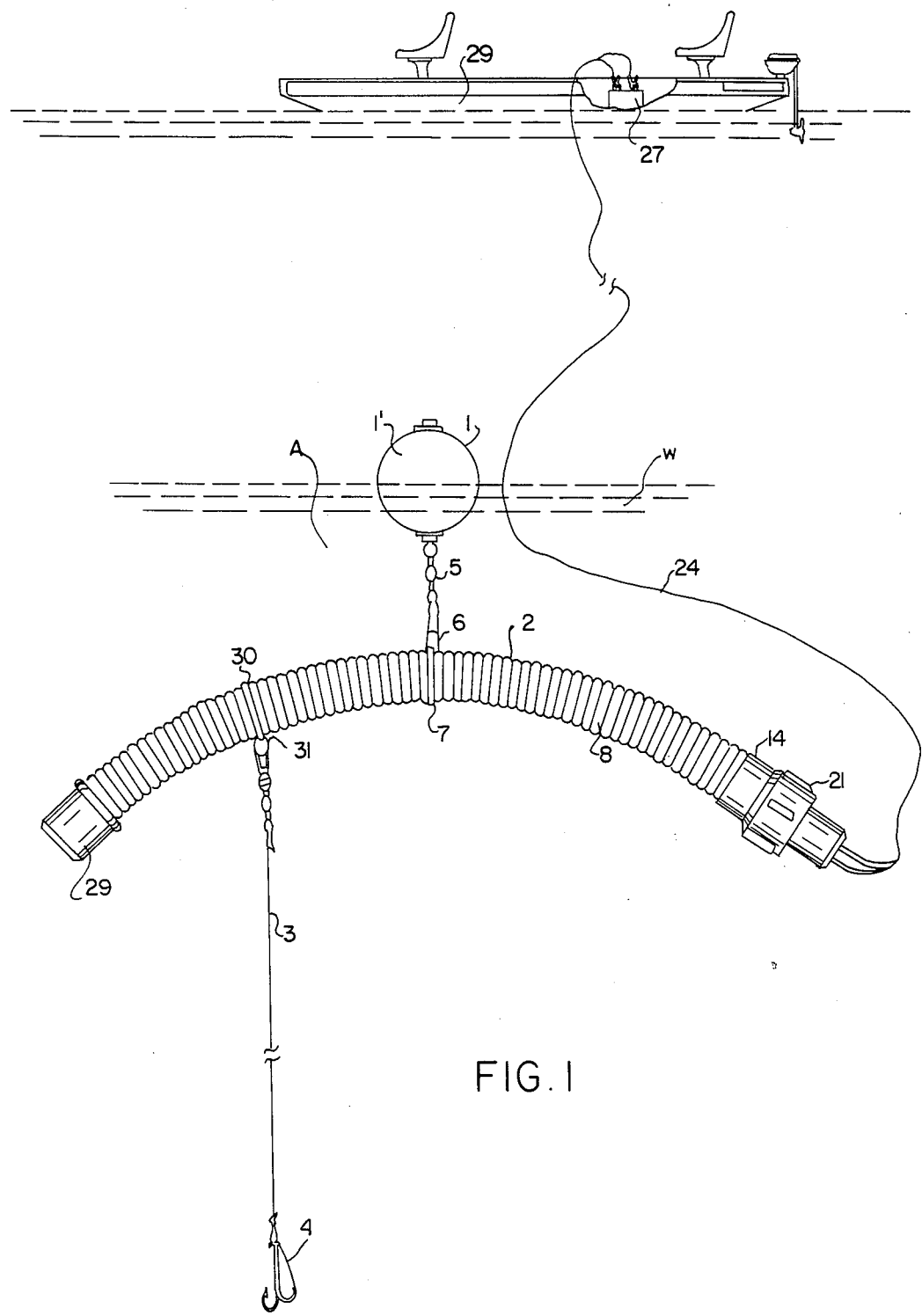
FIG. 1 is a perspective, environmental view illustrating an illuminated fishing assembly constructed in accordance with and embodying the present invention, showing the same in operative position.
Figure 2:
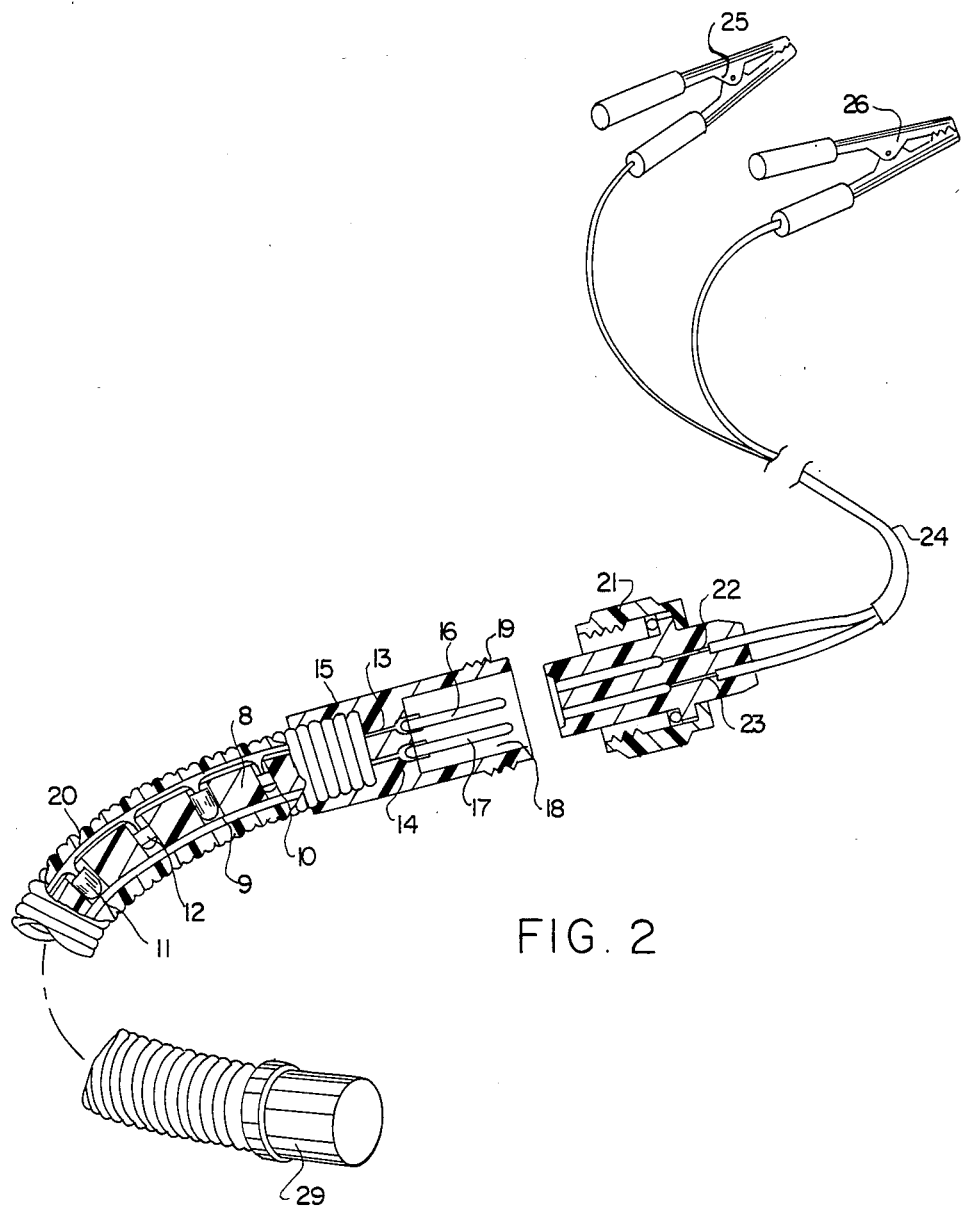
FIG. 2 is a perspective view of the illuminating component of the fishing assembly of the present invention, with the same being shown in partial section.

Referring now by reference characters to the accompanying drawings, A generally designates a fishing assembly embodying a float 1, a luminescent or illuminable member 2, a fishing line 3, and a lure 4. Float 1 is of conventional character being of generally spherical or global form; being preferably hollow and fabricated of plastic materials with its upper float portion 1' disposed above the surface of the particular body of water indicated at w. Secured to the under surface of float 1 and for extension downwardly therefrom is a cable, chain, line, or articulated length 5 with a connector 6 at the lower end thereof suitable for engagement to a cooperating element 7 carried upon luminescent member 2.

Said luminescent member 2 forms the subject matter of U.S. Pat. No. 4,607,317 granted Aug. 19, 1986 upon an invention entitled "Non-neon Light" and, accordingly, the teachings of said patent are incorporated by reference herein. Thus, although this last mentioned patent provided a detailed disclosure of member 2 the fundamental character thereof will be described herein for the purpose of exposition but with the understanding that such is not in any way intended or designed to inadvertently modify or restrict the disclosure of the aforesaid patent.

Member 2 constitutes an elongated, bendable, and foldable bar 8 having throughout its length a series of relatively large holes 9 and with smaller holes 10 being disposed between adjacent larger holes 9. Larger holes 9 accept bulbs or lamps 11 while conductive plugs 12 are received within smaller holes 10. Preselected numbers of bulbs 11 are connected in series and then in parallel with conductors 13, 14. The latter at one end extend through a nut-forming body 15 for connection to the prongs 16, 17, respectively, located within the cylindrical recess 18 of a connector plug indicated at 19. Enclosing bar 8 is a circumferential outer wall or sleeve 20 fabricated preferably of soft or semi-soft PVC or similar plastic and being transparent or semi-transparent for light transmission therethrough. It is, of course, apparent that the material of outer wall 20 may be colored or colorless as desired.

Connector plug 19 is adapted for engagement with a connector socket member 21 with the leads 22, 23 therefrom being encased within a cable 24 of suitable length for connection as, for instance, by alligator clips 25, 26, respectively, to the electrodes of a battery 27 or other power source carried within a boat 28 or located on the shore at the fisherman's election. The end of said bar 8 remote from connector plug 19 may be provided with a soft or semi-soft plastic or rubber protective cylinder 29. Accordingly, the energization of bulbs 11 is easily controlled by the fisherman by the mere optional engagement or disengagement of the alligator clips 25, 26 to the power source. Bar 8 may be of any preselected length so that upon activation a commensurate zone of ambient water will be illuminated. Quite obviously, a multiplicity of floats 1 may be used if necessary in view of the particular bar length selected, should such be required. It will be seen that luminescent member 2 is thus freely suspended from float 1 and the length of suspending device 5 may be selected depending on the depth at which the fisherman wishes to present luminescent member 2. It will be observed that element 7 is of any suitable design but is illustrated herein as being of annular configuration in embracing bar 8.

As pointed out hereinabove, fishing line 3 is suspended from bar 8 in any appropriate manner; there being cooperative elements indicated at 30, 31, provided on bar 8 and at the upper end of fishing line 3, respectively, for bringing about effective, detachable interengagement. Fishing line 3 may be of any predetermined length as the fisherman may elect depending upon the body of water being fished. Lure 4 is of any conventional, well-known construction, at the nature of thereof is not dependent upon bar 8 or any aspects thereof. The present invention thus does not necessitate specially constructed lures, but is totally unrestricted in that respect so that a fisherman's bait or lure selection is dictated by the particular fishing conditions and not by any structural requirements.

The actual utilization of fishing assembly A should be quite patent from the foregoing. A fisherman will engage the connectors 25, 26, respectively, to the particular power source 27 and, with the float 1 and fishing line 3 suitably engaged to bar 8, locate assembly A at any desired position in the body of water to be fished with the length of cable 24 such as to permit a preselected distance between the fisherman and assembly A.

With connectors 25, 26, respectively, in engaged condition, bar 8 is rendered luminescent and thereby effect a light transmission troughout the surrounding zone. Such will be visable to a degree to the fisherman depending upon the distance at which bar 8 is disposed. The light emitted from bar 8 will serve to attract fish and thus cause the latter to be brought into the field of the lure for engagement thereby and also serve to render the lure visible enhancing the potential for catching fish.

As pointed out above, bar 8 may b of any desired length so that a commensurate zone of attraction ma be developed. In view of the electrical nature of bar 8, it is apparent that a waterproof piezo buzzer may be plugged into one end of bar 8 as in the terminal remote from connector plug 19. Thus, sonic means could be provided as an additional source for fish attraction.

What is claimed:

1. An illuminated fishing assembly comprising a bendable and foldable bar having a transparent exterior wall, illuminable elements carried within said bar for providing light transmissible through said exterior wall, a remotely located power source, means connecting said power source and said illuminable elements, a buoyant member, means engaging said bouyant member to said bar for suspension of the latter within the body of the water being fished, and fish attracting means suspended from said bar.

2. An illuminated fishing assembly as defined in claim 1 wherein said illuminable elements comprise a plurality of bulbs arranged lengthwise of said bar, conductive means interconnecting said bulbs, said means engaging said bouyant member to said bar comprising an elongated flexible member of any predetermined length, said bouyant member being adapted to float in the body of water with the upper portion thereof exposed.

3. An illuminated fishing assembly as defined in claim 2 wherein a fishing line having an upper end and a lower end is suspended at the upper end thereof from said bar, and said fish attracting means being engaged to the lower end of said fishing line.

4. An illuminated fishing assembly as defined in claim 1 wherein said foldable bar may be of any predetermined length, said transparent exterior wall being of preselected coloration, and said fish attracting means being a lure of conventional construction.

5. An illuminated fishing assembly as defined in claim 4 wherein said means connecting said power source and said illuminable elements comprise a cable of any preselected length, and connector means detachably interengaging said cable and said bar.

6. An illuminated fishing assembly as defined in claim 1 wherein said fish attracting means comprises a fishing line of any predetermined length, means suspending said fishing line from said bar, and bait provided on said fishing line remote from the point of suspension thereof on said bar.

* * * * *